(12) United States Patent
Forster

(10) Patent No.: US 9,038,918 B2
(45) Date of Patent: May 26, 2015

(54) ANTENNA FOR RFID DEVICE AND METHOD FOR MAKING THE SAME

(71) Applicant: Ian James Forster, Essex (GB)

(72) Inventor: Ian James Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/105,773

(22) Filed: Dec. 13, 2013

(65) Prior Publication Data

US 2014/0191045 A1    Jul. 10, 2014

Related U.S. Application Data

(60) Provisional application No. 61/736,804, filed on Dec. 13, 2012.

(51) Int. Cl.
*G06K 19/06* (2006.01)
*H01Q 1/22* (2006.01)
*H01Q 1/38* (2006.01)
*G06K 19/077* (2006.01)

(52) U.S. Cl.
CPC ............... *H01Q 1/2208* (2013.01); *H01Q 1/38* (2013.01); *G06K 19/07749* (2013.01)

(58) Field of Classification Search
USPC .................................................. 235/492, 494
See application file for complete search history.

(56) References Cited

U.S. PATENT DOCUMENTS 8,302,289 B2 * 11/2012 Forster et al. .................... 29/729
2012/0064307 A1 * 3/2012 Forster et al. .............. 428/195.1

* cited by examiner

*Primary Examiner* — Christle I Marshall
(74) *Attorney, Agent, or Firm* — Avery Dennison Retail Information Services LLC

(57) ABSTRACT

An RFID tag or label or device includes an RFID chip and an antenna. The antenna is manufactured by weakening a portion of a foil material, which weakened portion may be in a tessellating pattern. The foil material is then placed in contact with adhesive on a substrate. The foil material and substrate are separated, so as to retain on the substrate the portion of the foil material in contact with the adhesive. The foil material remaining on the substrate defines an antenna, which may subsequently be electrically connected to an RFID chip to provide an RFID tag or label or device.

19 Claims, 3 Drawing Sheets

ANTENNA FOR RFID DEVICE AND METHOD FOR MAKING THE SAME

CROSS-REFERENCE TO RELATED APPLICATION

The present application claims priority from U.S. Provisional Application No. 61/736,804 filed Dec. 13, 2012, which is incorporated by herein by reference in its entirety.

FIELD OF THE INVENTION

The present subject matter relates to radio frequency identification ("RFID") devices. More particularly, the present subject matter relates to antennae for RFID devices and methods for making such antennae.

DESCRIPTION OF RELATED ART

Devices incorporating RFID technology are widely used for a variety of different applications, including security locks in cars, access control to buildings, and inventory tracking systems.

RFID devices may have a variety of integrated components, among them an RFID chip containing data (e.g., an identification code) and an antenna electrically connected to the chip and responsible for transmitting signals to and/or receiving signals from another RFID device (e.g., an RFID reader system).

RFID devices may be manufactured in a variety of ways, such as by patterning, etching, or printing a conductor on a dielectric layer and coupling the conductor to an RFID chip. The desirability for these devices to be thin and flexible renders some conductors unsuitable or less commonly used, while rendering other conductors and manufacturing methods (e.g., the use of printed conductive inks to create an antenna) more suitable or more commonly used. While many advances have been made in manufacturing thin, flexible RFID devices, there still remains room for improvement of RFID devices and manufacturing processes relating thereto.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a method is provided for manufacturing an antenna for an RFID device. According to the method, a weakened portion is formed in a foil material. At least a portion of the foil material is placed in contact with adhesive on a substrate. The foil material is then separated from the substrate so as to retain on the substrate the portion of the foil material in contact with the adhesive, thereby defining an antenna for an RFID device.

In another aspect, a method is provided for manufacturing an RFID device. According to the method, a weakened portion is formed in a foil material. At least a portion of the foil material is placed in contact with adhesive on a substrate. The foil material is then separated from the substrate so as to retain on the substrate the portion of the foil material in contact with the adhesive, thereby defining an antenna. The antenna is then electrically connected to an RFID chip.

In yet another aspect, an RFID device is provided. The RFID device is manufactured by forming a weakened portion in a foil material. At least a portion of the foil material is placed in contact with adhesive on a substrate. The foil material is then separated from the substrate so as to retain on the substrate the portion of the foil material in contact with the adhesive, thereby defining an antenna. The antenna is then electrically connected to an RFID chip to provide an RFID device.

In a further aspect, a method is provided for manufacturing an antenna for an RFID device. According to the method, a weakened portion is formed in a tessellating foil material. At least a portion of the foil material having tessellating weakness locations is placed in contact with adhesive on a substrate. The foil material is then separated from the substrate so as to retain on the substrate the portion of the foil material in contact with the adhesive, thereby defining an antenna for an RFID device.

In another aspect, a method is provided for manufacturing an RFID device. According to the method, a weakened portion is formed in a tessellating foil material. At least a portion of the foil material is placed in contact with adhesive on a substrate. The foil material is then separated from the substrate so as to retain on the substrate the portion of the foil material in contact with the adhesive and lying along a tessellating weakness location, thereby defining an antenna. The antenna is then electrically connected to an RFID chip.

In yet a further aspect, an RFID device is provided. The RFID device is manufactured by forming a tessellating weakened portion in a foil material. At least a portion of the foil material is placed in contact with adhesive on a substrate. The foil material is then separated from the substrate so as to retain on the substrate the portion of the foil material in contact with the adhesive, thereby defining an antenna at least partially following the tessellating weakened portion. The antenna is then electrically connected to an RFID chip to provide an RFID device.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
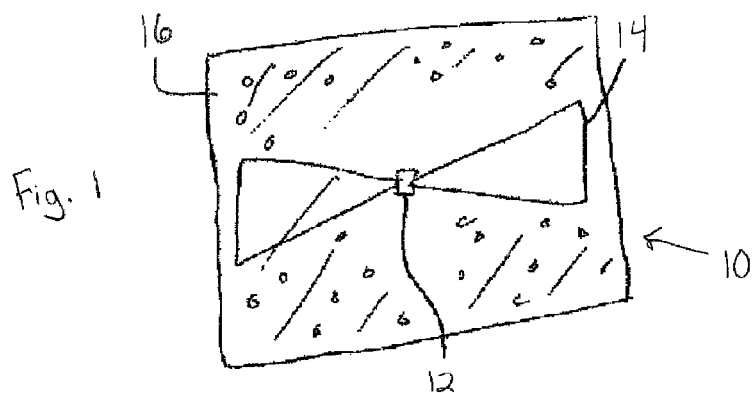
FIG. 1 is a schematic view of an RFID device.

FIG. 1 shows the basic structure of one embodiment of an RFID tag or label or device 10 that may be manufactured according to the methods of the present disclosure. In the embodiment of FIG. 1, the RFID device 10 includes an RFID chip 12, with an antenna 14 electrically connected to the RFID chip 12. As used herein, the term "electrically connected" can include any number of electrical connections, such as a direct ohmic connection between the RFID chip 12 and antenna 14; an ohmic connection formed between a strap or interposer carrying an RFID chip and the antenna; electric field coupling; magnetic field coupling or a combination of mechanisms or any other known mechanism that allow for the transfer of RF energy between the RFID chip/strap and antenna when placed in proximity to each other.

While still referring to FIG. 1 other components, such as a sensor or the like, may also be incorporated into the RFID device 10 without departing from the scope of the present disclosure. The RFID device 10 is configured to interact with another RFID-enabled device, such as an RFID reader, by receiving signals from the other device and/or transmitting signals to the other device. The antenna 14 is the component of the RFID device 10 that transmits signals to the other device, while the RFID chip 12 determines the nature of the signals transmitted by the antenna 14. Both the RFID chip 12 and the antenna 14 are secured or affixed to an underlying substrate 16, which may be relatively thin and flexible.

According to one aspect of the present disclosure, the antenna 14 is manufactured from a foil material 18 (FIG. 2), such as aluminum foil. In the illustrated embodiment, the foil material 18 is provided as a generally planar sheet, which may be advantageous for providing a thin and flexible RFID device 10, but the foil material may be otherwise configured without departing from the scope of the present disclosure.

Figure 2:
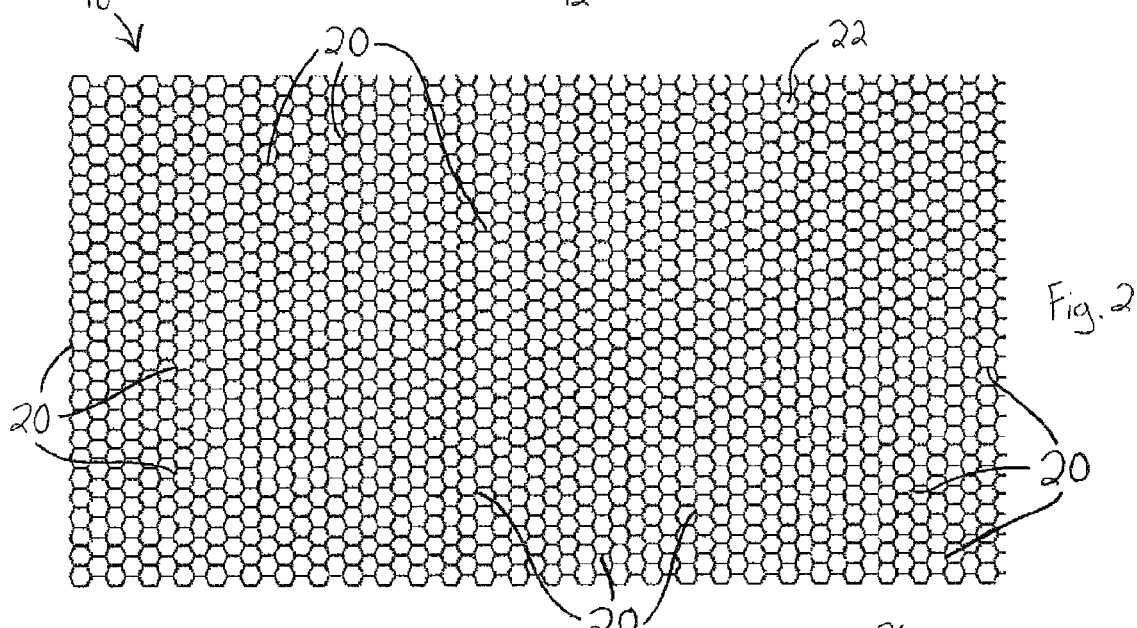
FIG. 2 is a top plan view of a foil material having a pattern of tessellating shapes with a weakened boundary between adjacent shapes.
Figure 2A:
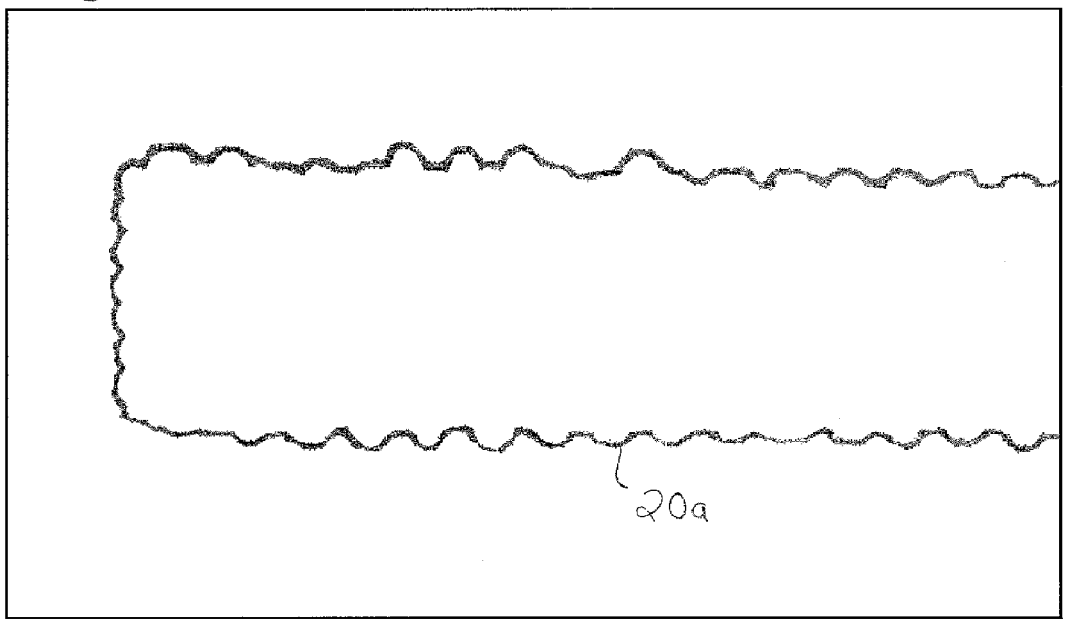
FIG. 2a is a top plan view of a foil material having an alternative weakened portion.

The foil material 18 is provided with a weakened portion 20, which is shown in FIG. 2 as a border between a plurality of hexagonal shapes 22 arranged in a tessellating hexagonal pattern. While FIG. 2 shows the weakened portion 20 provided as a border between adjacent hexagonal shapes arranged in a repeating pattern, other tessellating patterns, such as triangular, parallelogram, or diamond mosaics, may also be employed without departing from the scope of the present disclosure. Furthermore, as shown in FIG. 2a, it is also within the scope of the present disclosure for the foil material 18a to have a weakened portion 20a provided in a shape or configuration other than a repeating pattern. Additionally, a piece of foil material may include a plurality of separate weakened portions, with the different weakened portions having the same or different configurations.

The weakened portion 20, 20a may be formed by any method that is suitable for decreasing the strength of the foil material 18, 18a. For example, the foil material 18, 18a may be subjected to physical processing (e.g., a rotary embossing tool or an imprinting or stamping or scoring or cutting operation) or exposure to a chemical or light (e.g., laser processing) to form the weakened portion 20, 20a. The weakened portion may comprise a thinned portion 24 of the foil material (as in FIG. 4) or a removed portion 26 of the foil material (as in FIG. 5). It is also within the scope of the present disclosure for a single weakened portion to include a combination of thinned sections 24 and removed sections 26.

Figure 3:
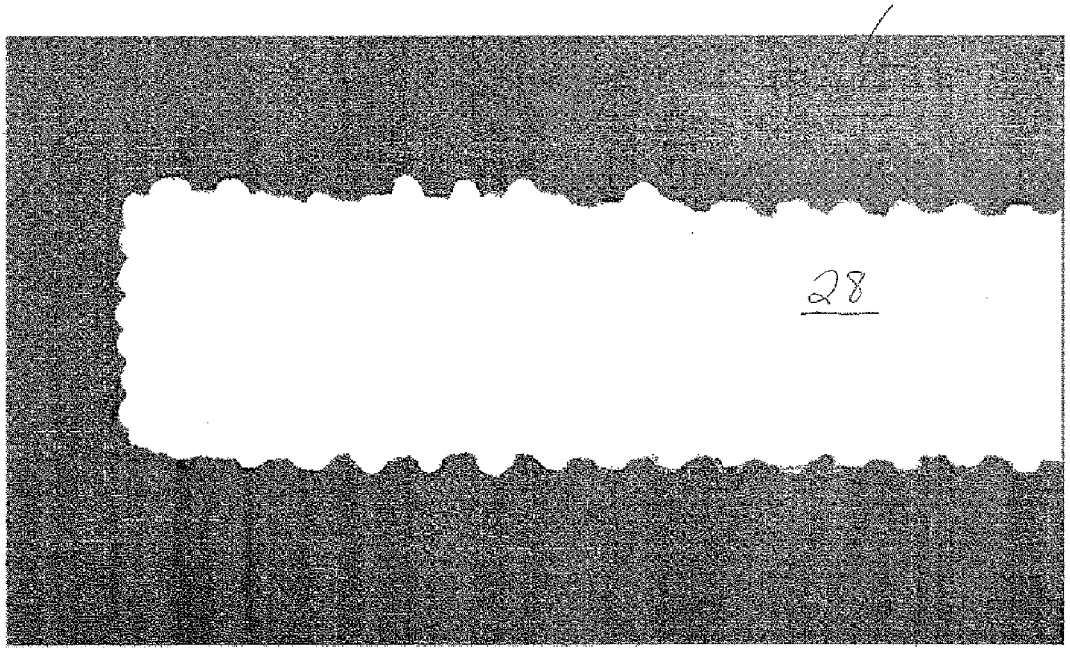
FIG. 3 is a top plan view of a substrate having an adhesive.

The foil material 18, 18a (with one or more weakened portions) is brought into contact with adhesive on a substrate. FIG. 3 shows an example of a substrate 16 having an adhesive 28 printed or otherwise applied thereon in selected locations.

In the illustrated embodiment, the adhesive 28 is present in a shape having an outer border in register with or generally corresponding to the configuration of the weakened portion 20a of FIG. 2a, but it should be understood that foil material having a weakened portion differing from the shape of the adhesive (e.g., the combination of the foil material 18 of FIG. 2 and the adhesive pattern 28 of FIG. 3). The configuration of the adhesive 28 in FIG. 3 is merely exemplary, and the adhesive may be provided in a different pattern.

Figures 4, 5:
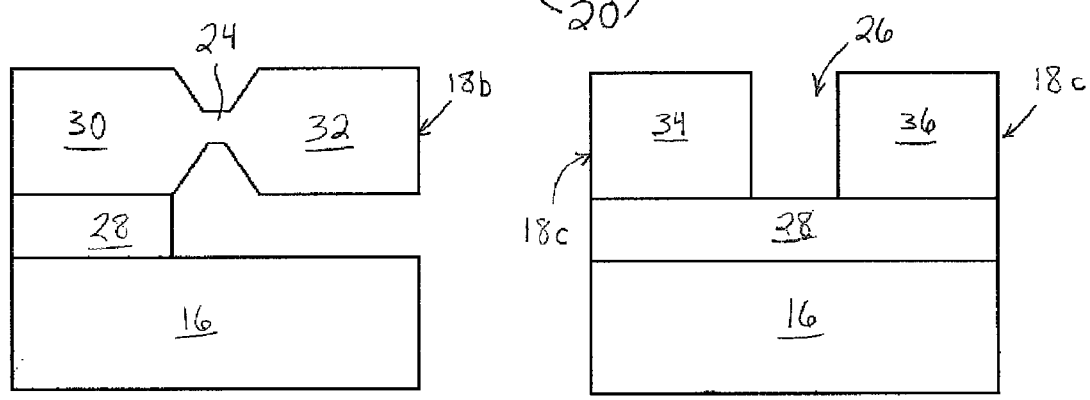
FIG. 4 is a cross-sectional view of a foil material applied to adhesive on a substrate.
FIG. 5 is a cross-sectional view of an alternative foil material applied to adhesive on a substrate.

FIGS. 4 and 5 are cross-sectional views of different embodiments of foil material in contact with adhesive on a substrate. In the embodiment of FIG. 4, the foil material 18b has a weakened portion 24 comprising a relatively thin section (which may be formed by any suitable approach, such as by physical contact or manipulation; a stamping, scoring, and/or embossing operation; and/or the application of energy, such as by laser, sonic, and/or vibrational energy, for example). Only a portion 30 of the foil material 18b is in contact with the adhesive 28, with the weakened portion 24 and another portion 32 of the foil material 18b being positioned above a portion of the substrate 16 in which the adhesive 28 is not present.

In the embodiment of FIG. 5, the foil material 18c has a weakened portion 26 comprising a removed section (which may be formed by cutting entirely through the foil material 18c by any suitable approach, such as by physical contact or manipulation; a stamping, cutting, scoring, and/or embossing operation; and/or the application of energy, such as by laser, sonic, and/or vibrational energy, for example). Both illustrated sections 34 and 36 of the foil material 18c are in contact with the adhesive 28, with the weakened portion 26 also being positioned above the adhesive 28.

In other embodiments, the removed section 26 may be positioned at least partially above a portion of the substrate 16 having no adhesive 28. Same may be in combination with or alternative to having a thinned section 24 positioned at least partially above a portion of the substrate 16 in which adhesive 28 is present. Such variations may also be used in combination with the embodiments illustrated in FIGS. 4 and 5.

Figure 6:
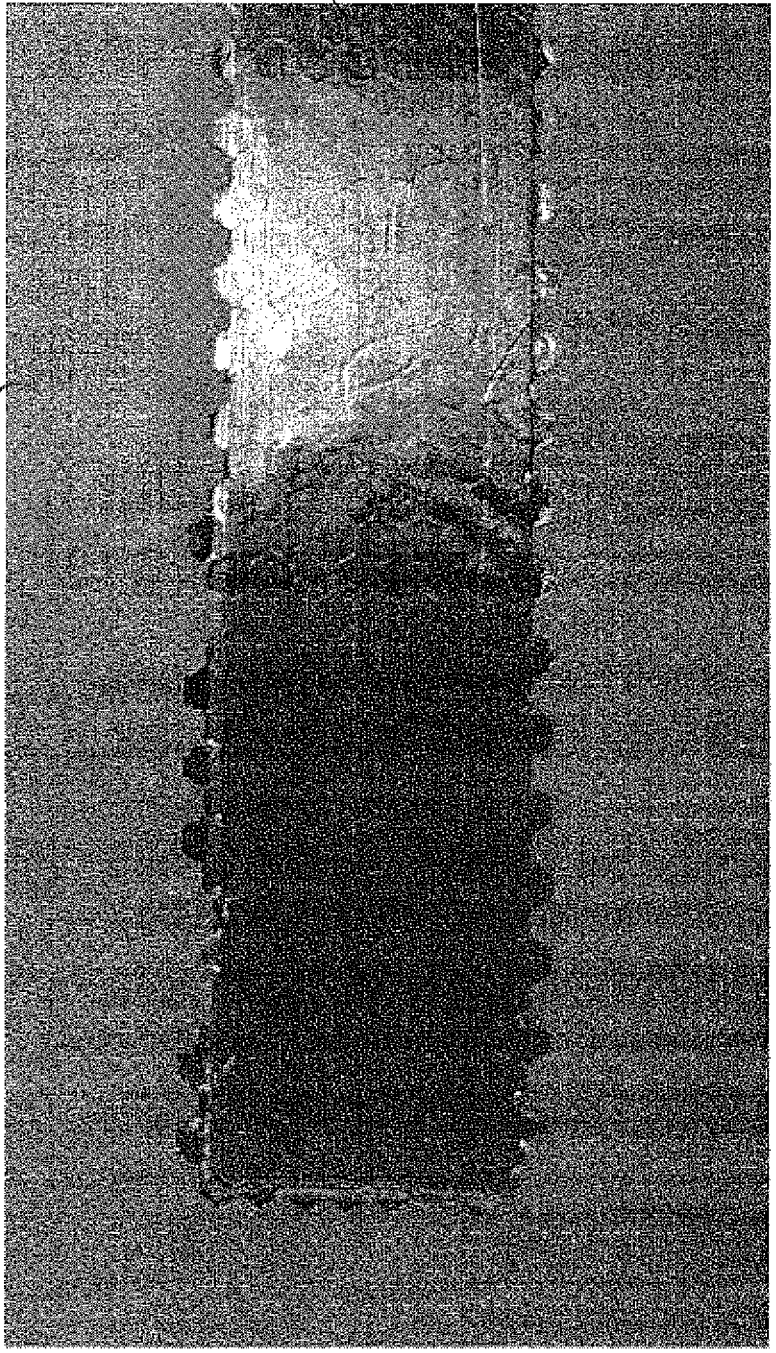
FIG. 6 is a top plan view, in magnification, of an antenna formed by a manufacturing method according to the present disclosure.

After sufficient time has elapsed to ensure that the foil material 18, 18a is secured to the adhesive 28, the foil material 18, 18a may be stripped or otherwise separated from the substrate 16. FIG. 6 shows an example of the result of applying a foil material 18, 18a to the adhesive 28 of FIG. 3 and then separating the foil material 18, 18a from the substrate 16. As can be seen, the foil material 18, 18a is retained on the substrate 16 at the locations in which it is in contact with the adhesive 28. On the other hand, the portions of the foil material 18, 18a not in contact with the adhesive 28 (i.e., the portions of the foil material 18, 18a extending outside of the boundary of the adhesive 28 when the foil material 18, 18a is placed in contact with the adhesive 28) may be disassociated from the substrate 16 by the stripping/separating process. To assist in separating the appropriate portions of the foil material 18, 18a from the substrate 16, it may be advantageous for a weakened portion to be present at or just outside of the edges or perimeter of the adhesive 28, as the weakened portion is more readily separated from the substrate 16 than an unweakened portion of the foil material 18, 18a.

In the example of FIG. 4, the weakened portion 24 and the rightmost section 32 of the foil material 18b will be separated from the substrate 16 as a result of the stripping/separating process, whereas the leftmost section 30 of the foil material 18b (which is in contact with the adhesive 28) will be retained. In the example of FIG. 5, both sections 34 and 36 of the foil material 18c will be retained as a result of the stripping/separating process (as they are both in contact with the adhesive 28), while the weakened portion 26 defines a gap between the two sections 34 and 36. FIG. 4 is an example of the adhesive pattern being in register with the pattern of the weakened portion 24 (such that the foil material 18b separates from the substrate 16 at the weakened portion 24), while FIG. 5 is an example of a location in which the adhesive pattern is not in register with the pattern of the weakened portion 28.

The portion of the foil material 18, 18a retained on the substrate 16 defines an antenna 14 that may be incorporated into an RFID device 10, such as one of the type shown in FIG. 1. With the antenna 14 so formed, an RFID chip 12 (and any other desired components) may be associated to the substrate 16 and electrically connected to the antenna 14 to complete the RFID device 10. If there is a gap between portions of the antenna 14 (as in FIG. 5) that are advantageously electrically connected together, the adjacent edges may be joined by a welding operation or the like.

Employing weakened portions allows for the use of relatively thick foil material, because the foil material can separate from the substrate at the weakened portions rather than having to tear or break through the entire thickness of the foil material. The thicker foil material results in a more robust and improved conductor in comparison to antennae formed with thinner foil material, without unduly increasing the thickness or stiffness of the resulting RFID device. At the same time, employing foil material having a tessellating weakened portion does allow for antenna widths that are narrow enough to be suitable for a miniature RFID system when needed for applications where available space and/or volume are restricted or limited.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

What is claimed is:

1. A method for manufacturing an antenna for an RFID device, comprising:
   providing a foil material;
   forming a weakened portion in the foil material;
   providing a substrate having an adhesive;
   placing at least a portion of the foil material in contact with the adhesive of the substrate; and
   separating the foil material from the substrate so as to retain on the substrate the portion of the foil material in contact with the adhesive, thereby defining an antenna for an RFID device.

2. The method of claim 1, wherein
   said providing a foil material includes forming at least two shapes in the foil material with a boundary between the at least two shapes, and
   said forming a weakened portion in the foil material includes weakening at least a portion of the boundary.

3. The method of claim 2, wherein said forming a weakened portion in the foil material includes thinning the foil material along at least a portion of the boundary.

4. The method of claim 2, wherein said forming a weakened portion in the foil material includes removing the foil material along at least a portion of the boundary.

5. The method of claim 1, wherein
   said providing a foil material includes forming more than two shapes in the foil material with a boundary between adjacent shapes, and
   said forming a weakened portion in the foil material includes weakening at least a portion of at least one of the boundaries.

6. The method of claim 1, wherein
   said providing a foil material includes forming a pattern of tessellating shapes in the foil material with a boundary between adjacent tessellating shapes, and
   said forming a weakened portion in the foil material includes weakening at least a portion of at least one of the boundaries.

7. The method of claim 6, wherein said pattern of tessellating shapes is formed by rotary embossing.

8. The method of claim 6, wherein said pattern of tessellating shapes is formed by laser processing.

9. The method of claim 1, wherein said separating the foil material from the substrate includes separating the foil material from the substrate at the weakened portion.

10. A method for manufacturing an RFID device, comprising:
    providing a foil material;
    forming a weakened portion in the foil material;
    providing a substrate having an adhesive;
    placing at least a portion of the foil material in contact with the adhesive of the substrate;
    separating the foil material from the substrate so as to retain on the substrate the portion of the foil material in contact with the adhesive, thereby defining an antenna;
    providing an RFID chip; and
    electrically connecting the RFID chip to the antenna.

11. The method of claim 10, wherein
    said providing a foil material includes forming at least two shapes in the foil material with a boundary between the at least two shapes, and
    said forming a weakened portion in the foil material includes weakening at least a portion of the boundary.

12. The method of claim 11, wherein said forming a weakened portion in the foil material includes thinning the foil material along at least a portion of the boundary.

13. The method of claim 11, wherein said forming a weakened portion in the foil material includes removing the foil material along at least a portion of the boundary.

14. The method of claim 10, wherein
    said providing a foil material includes forming more than two shapes in the foil material with a boundary between adjacent shapes, and
    said forming a weakened portion in the foil material includes weakening at least a portion of at least one of the boundaries.

15. The method of claim 10, wherein
    said providing a foil material includes forming a pattern of tessellating shapes in the foil material with a boundary between adjacent tessellating shapes, and
    said forming a weakened portion in the foil material includes weakening at least a portion of at least one of the boundaries.

16. The method of claim 15, wherein said pattern of tessellating shapes is formed by rotary embossing.

17. The method of claim 15, wherein said pattern of tessellating shapes is formed by laser processing.

18. The method of claim 10, wherein said separating the foil material from the substrate includes separating the foil material from the substrate at the weakened portion.

19. An RFID device manufactured by a process comprising:
- providing a foil material;
- forming a weakened portion in the foil material;
- providing a substrate having an adhesive;
- placing at least a portion of the foil material in contact with the adhesive of the substrate;
- separating the foil material from the substrate so as to retain on the substrate the portion of the foil material in contact with the adhesive, thereby defining an antenna;
- providing an RFID chip; and
- electrically connecting the RFID chip to the antenna.

* * * * *